United States Patent [19]
Goto et al.

[11] Patent Number: 5,647,914
[45] Date of Patent: Jul. 15, 1997

[54] NONAQUEOUS SOLVENT REGENERATING METHOD FOR USE IN CLEANING

[75] Inventors: Mitsuo Goto, Yokohama; Kunihiko Uzawa, Machida; Masahiro Itakura, Kamiina-gun; Masamichi Hijino, Hachiohji, all of Japan

[73] Assignee: Olympus Optical Co., Ltd., Japan

[21] Appl. No.: 436,233

[22] PCT Filed: Jul. 26, 1994

[86] PCT No.: PCT/JP94/01225

§ 371 Date: May 17, 1995

§ 102(e) Date: May 17, 1995

[51] Int. Cl.$^6$ .................... B08B 3/08; B08B 3/14
[52] U.S. Cl. .................... 134/10; 134/26; 134/40; 134/42
[58] Field of Search .................... 134/2, 10, 26, 134/42, 30, 40, 29; 210/767; 252/60

[56] References Cited

U.S. PATENT DOCUMENTS

| | | | |
|---|---|---|---|
| 2,993,866 | 7/1961 | Vaughn et al. | 252/171 |
| 3,977,982 | 8/1976 | Hertl | 252/60 |
| 4,501,682 | 2/1985 | Goodman et al. | 252/174.15 |
| 4,613,380 | 9/1986 | Chen | 134/30 |
| 4,689,168 | 8/1987 | Requejo | 252/139 |
| 5,274,008 | 12/1993 | Lai | 523/107 |
| 5,279,747 | 1/1994 | Chu | 210/751 |

FOREIGN PATENT DOCUMENTS 5-309205  11/1993  Japan.
6-142404   5/1994  Japan.

*Primary Examiner*—Harold Pyon
*Attorney, Agent, or Firm*—Ostrolenk, Faber, Gerb & Soffen, LLP

[57] ABSTRACT

The nonaqueous solvent employed in drying as a final step of cleaning is regenerated. The nonaqueous solvent is contacted with a separation fluid having low compatibility with the nonaqueous solvent and high compatibility with a hydrophilic solvent to cause the hydrophilic solvent contained in the nonaqueous solvent to be absorbed in the separation fluid, thereby regenerating the nonaqueous solvent. When the hydrophilic solvent is an alcohol, a low-molecular-weight silicone compound and demineralized water may be used as the nonaqueous solvent and the separation fluid, respectively, in which the silicone compound can be regenerated to a purity of 99.0 to 99.8% so that the silicone compound can be recycled for use in the drying.

8 Claims, 9 Drawing Sheets

NONAQUEOUS SOLVENT REGENERATING METHOD FOR USE IN CLEANING

DESCRIPTION

1. Technical Field

The present invention relates to a nonaqueous solvent regenerating method in which a hydrophilic solvent, such as an alcohol, introduced in the previous step is separated from a nonaqueous solvent, such as a silicone compound, employed in cleaning of a metal part or an optical part, such as a lens or a prism. The present invention also relates to an apparatus suitable for use in the above method.

2. Background Art

Fluorocarbons have widely been used as a dehydrating or drying agent in the final step of cleaning of optical parts such as a glass lens and plastic items and other parts such as semiconductors and mount substrates. However, the fluorocarbons have a grave drawback in that they destroy the ozonosphere. Various studies have been made to provide substitutes for the fluorocarbons. In recent years, the drying with the use of IPA (isopropyl alcohol) vapor have been carried out as described in the "Report on the results of cleaning of lenses and resins" (published by the Environmental Group of Japan Camera Industry Association in December, 1989). In the process involving the drying with the use of IPA vapor, first, a material to be cleaned is washed with a solvent, secondly with an aqueous surfactant, thirdly with clean water and fourthly with demineralized water, and thereafter washing for dehydration is carried out with the use of IPA fluid, which is evaporated off in the final drying step to thereby dry the material.

However, the IPA vapor is not only inflammable and explosible but also toxic to human health, so that not only are precautions required in handling but also recovery facilities must inevitably be of a large scale. In contrast, the inventors found that the drying of the hydrophilic solvent such as IPA could be accomplished by replacing the same caused to adhere to the material in the dehydrating step with a silicone compound, thereby rendering the evaporation of the hydrophilic solvent such as IPA unnecessary. Examples of the silicone compounds include low molecular weight silicone compounds such as octamethylcyclotetrasiloxane and octamethyltrisiloxane.

In the cleaning process in which the above silicone compound is employed in the final drying step, however, stain and unevenness are likely to occur in the cleaned material with the repetitions of the cleaning operation. The reason is that the silicone compound dissolves the hydrophilic solvent such as IPA to remove the same, so that the concentration of the hydrophilic solvent in the silicone compound increases with the repetitions of the cleaning operation to thereby lower the purity of the silicone compound. This purity lowering leads to bringing of the hydrophilic solvent into the nonaqueous solvent to thereby increase the water content of the nonaqueous solvent with the result that stain and unevenness occur in the cleaned material.

The present invention has been made taking the above situation into account. Thus, an object of the present invention is to provide a nonaqueous solvent regenerating method in which regeneration is carried out to maintain the purity of not only a silicone compound for use in removing hydrophilic solvents for drying but also other nonaqueous solvents for use in similar drying, so that recycling of the nonaqueous solvent while maintaining the drying power thereof is achieved. Another object of the present invention is to provide a regenerating apparatus suitable for use in the above regeneration of the nonaqueous solvent.

DISCLOSURE OF THE INVENTION

In the present invention, a hydrophilic solvent mixed in a nonaqueous solvent, whose compatibility with water is so low that it is substantially immiscible with water, is contacted with a separation fluid to thereby cause the separation fluid to absorb the hydrophilic solvent, so that the nonaqueous solvent is regenerated. Therefore, use is made of a separation fluid having low compatibility with the nonaqueous solvent and high compatibility with the hydrophilic solvent. The absorption of the hydrophilic solvent in the separation fluid is attained by this compatibility difference. Further, use is made of a separation fluid having a specific gravity greater than that of the nonaqueous solvent, which is contacted with the nonaqueous solvent to thereby achieve the separation of the separation fluid from the nonaqueous solvent by virtue of the specific gravity difference.

BEST MODE FOR CARRYING OUT THE INVENTION

Figure 1:
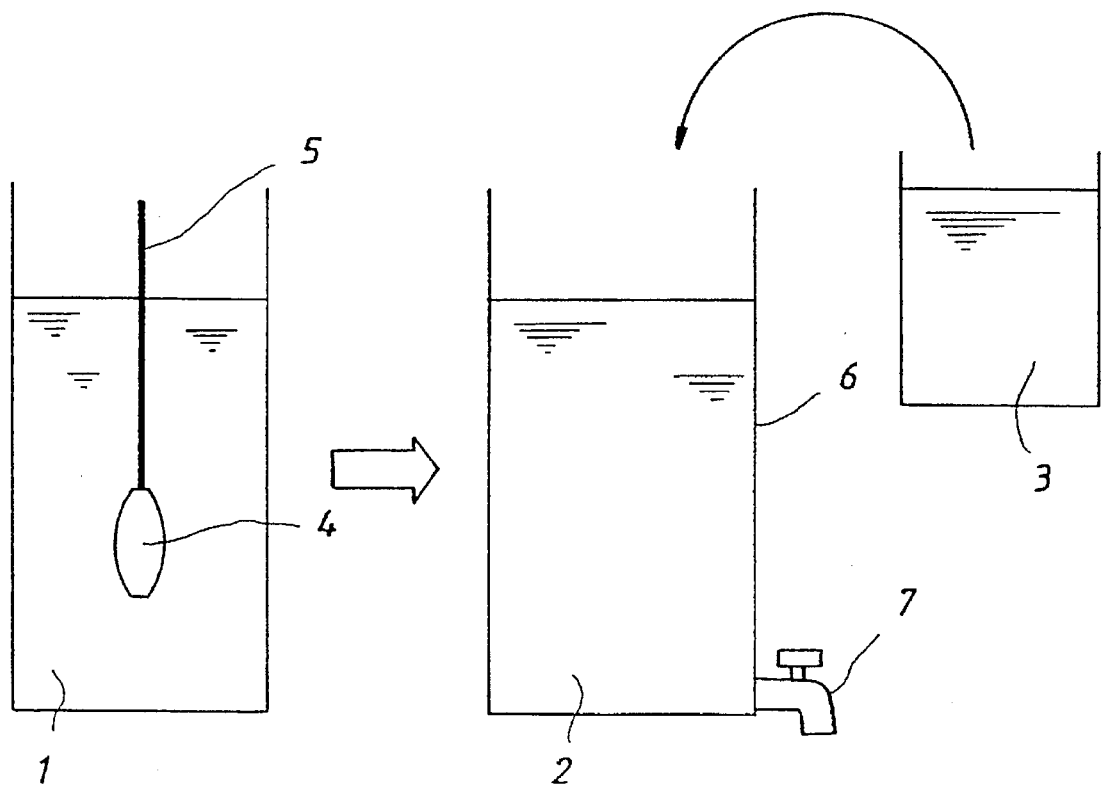
FIG. 1 is a view illustrating a regenerating method according to the first embodiment of the present invention.

The regenerating method of the present invention comprises contacting a hydrophilic solvent contained in a nonaqueous solvent with a separation fluid to thereby separate the hydrophilic solvent from the nonaqueous solvent. The nonaqueous solvent is used in the final drying step of cleaning, and, for example, a silicone compound may be used as the nonaqueous solvent. The silicone compound suitable for use as the nonaqueous solvent preferably has volatility at ordinary temperatures and compatibilities with hydrophilic solvents. The above separation fluid is to be insoluble in the silicone compound, and its compatibility with hydrophilic solvents is to be superior to that of the silicone compound. Water or demineralized water may be selected as the separation fluid.

The hydrophilic solvent is used for dehydrating the washed material, and IPA and other alcohols are often employed as the hydrophilic solvent. However, the hydrophilic solvent such as an alcohol has high capability of wetting a material to be cleaned, so that, when the material is dipped in the fluid and taken out therefrom, the surface of the material suffers from residue. Thus, drying is performed after the dehydration. The drying is accomplished by dipping in the nonaqueous solvent. In this drying, the hydrophilic solvent such as an alcohol is carried into the silicone compound by the material such as glass lens and electrical substrates. That is, the hydrophilic solvent such as an alcohol adhering to the washed material is dissolved in the silicone compound, so that the concentration of the hydrophilic solvent in the silicone compound is increased with the repetition of the cleaning operations.

The mixing of a separation fluid such as water which is superior in the compatibility with the hydrophilic solvent such as an alcohol to the silicone compound, which has a specific gravity greater than that of the silicone compound and which has no compatibility with the silicone compound (insoluble in the silicone compound), causes the hydrophilic solvent such as an alcohol having been dissolved in the silicone compound to be attracted by the separation fluid having affinity therewith rather than by the silicone compound. As a result, separation occurs into two liquid layers in which the sublayer is composed of the separation fluid having a specific gravity greater than that of the silicone compound together with the hydrophilic solvent attracted by the separation fluid while the upper layer is composed only of the silicone compound. Thus, the silicone compound can be freed of the hydrophilic solvent to thereby achieve regeneration of the silicone compound.

With respect to the properties of the silicone compound for use in the present invention, it is required to have high compatibility with the hydrophilic solvent such as an alcohol and high capability of drying the washed material.

The high compatibility with the hydrophilic solvent is required for fully washing away the hydrophilic solvent adhering to the washed material. This high compatibility may be imparted by introducing a polar group into the silicone compound or by decreasing the viscosity of the silicone compound.

A modified silicone may be mentioned as the silicone compound having a polar group introduced for high compatibility with each of hydrophilic compounds. The modified silicone has a fundamental skeleton of (SiO)n as a principal chain and an alkyl group as a side chain. The introduction of the alkyl group increases the compatibility with the hydrophilic solvent such as an alcohol. With respect to the low-viscosity silicone compound, a compound having a viscosity of up to 5.0 cSt (20° C.) has high compatibility with an alcohol, while a compound having a viscosity of greater than 5.0 cSt has low compatibility with an alcohol. Also, low-viscosity silane compounds have similar properties. The improvement of the compatibility can be attained by the incorporation of a phenyl group. The compatibility may be defined by the value of solubility parameter (SP value). Generally, the SP value of the silicone compound increases with the increase of the phenyl group content thereof. This increase brings about an increase of the compatibility with an alcohol.

High drying rate being another property which the nonaqueous solvent is required to have can be realized by reducing the molecular weight thereof. Thus, it is desired that the molecular weight of the silicone compound be not greater than 1000. Generally, there is a correlation between the molecular weight and the viscosity of the silicone compound. The smaller the molecular weight, the lower the viscosity. High drying rate is exhibited by a silicone compound having low viscosity. It is preferred that the viscosity of the silicone compound be not greater than 10 cSt (20° C.). When the viscosity is higher than the above value, the drying rate becomes markedly low.

When the drying rate and the compatibility with an alcohol are taken into account, the most suitable viscosity of the silicone compound is up to 5 cSt (20° C.), as described above. The silicone compound is physiologically inactive and its dangerousness is extremely low as compared with that of IPA. Moreover, the silicone compound has no property of corroding resins as different from IPA, so that it is free from adversely affecting the properties of a wide variety of materials to be cleaned.

One form of nonaqueous solvent regenerating apparatus suitable for use in the above regenerating method of the present invention comprises a washing vessel accommodating a nonaqueous solvent, a separation vessel accommodating at its lower part, (i.e., the part below about half its height), a separation fluid having low compatibility with the nonaqueous solvent and high compatibility with a hydrophilic solvent in which the hydrophilic solvent contained in the nonaqueous solvent is separated, a pipe leading the nonaqueous solvent from the washing vessel into a lower part of the separation vessel, a pipe leading the nonaqueous solvent from an upper part, (i.e., the part above about half its height), of the separation vessel into the washing vessel and means for circulating the nonaqueous solvent between the washing vessel and the separation vessel.

Another form of nonaqueous solvent regenerating apparatus according to the present invention comprises a washing vessel accommodating a nonaqueous solvent at its upper part and accommodating a separation fluid having low compatibility with the nonaqueous solvent and high compatibility with a hydrophilic solvent at its lower part, a pipe leading the nonaqueous solvent discharged from the upper part of the washing vessel into the lower part of the washing vessel and means for circulating the nonaqueous solvent between the upper and lower parts of the washing vessel.

In both of the above apparatuses, IPA used as a hydrophilic solvent is highly compatible with the silicone compound as a nonaqueous solvent, so that the former is dissolved in the latter in the washing vessel. When the above nonaqueous solvent is passed through the separation fluid of water or demineralized water having low compatibility with the silicone compound and compatibility with IPA higher than that of the silicone compound, the IPA having been dissolved in the silicone compound is attracted by the water. As a result, the IPA is removed from the silicone compound. The silicone compound forms a liquid layer on the water in which IPA has been dissolved because its specific gravity is lower than that of the water.

The nonaqueous solvent can be easily passed through the separation fluid by charging the nonaqueous solvent from a lower part of the separation fluid accommodated in a lower part of the separation vessel or the washing vessel.

The separation fluid having the hydrophilic solvent dissolved therein is periodically discarded to thereby maintain a high separating power.

The SP values, as measures of the compatibility, of water, IPA and silicone are 23.4, 11.45 and 5.5, respectively. When these three are mixed, IR analysis shows that water has a compatibility with IPA higher than that of silicone.

In the above embodiment, water or demineralized water has been used as the separation fluid, and IPA has been used as the hydrophilic solvent. The present invention is not limited thereto, and, depending on SP values as measures of the compatibility, acetic acid, hydrochloric acid, nitric acid and sulfuric acid solutions may be employed as the separation fluid and acetone, ethanol, methanol and methyl ethyl ketone (MEK) as the hydrophilic solvent.

A further form of regenerating aqueous suitable for use in the present invention comprises a separation vessel in which a nonaqueous solvent used in washing is contacted with a separation fluid to cause a hydrophilic solvent contained in the nonaqueous solvent to be absorbed in the separation fluid, thereby separating the hydrophilic solvent from the nonaqueous solvent, a separation plate disposed in the separation vessel so as to cause the nonaqueous solvent to rise therealong and a vessel in which the nonaqueous solvent from the separation vessel is separated from the separation fluid by specific gravity difference.

In this form of regenerating apparatus, the time and area in which the hydrophilic solvent contained in the nonaqueous solvent contacts the separation fluid are increased in the course of the rise of the hydrophilic solvent along the separation plate in the separation vessel, so that only the hydrophilic solvent contained in the nonaqueous solvent is absorbed in the water by virtue of the dissolution in the separation fluid. Then, a nonaqueous solvent of high purity is regenerated by the contact with the separation fluid. At that time, foreign matter can also be separated by specific gravity difference.

The regenerating method and apparatus according to the present invention will be described below with reference to the following Examples.

(Example 1)

FIG. 1 illustrates a regenerating method according to the first embodiment of the present invention. In this embodiment, IPA was used as a hydrophilic solvent 1, and hexamethyldisiloxane of the formula $(CH_3)_3SiOSi(CH_3)_3$ (viscosity of 0.65 cSt at 20° C.) was used as a nonaqueous solvent 2 removing IPA for drying. This drying fluid 2 may be prepared by blending those having respective viscosities of 0.65 cSt and 1 cSt to thereby regulate the viscosity of the drying fluid and hence to regulate the drying rate and compatibility with IPA. Demineralized water was used as a separation fluid 3 separating the hydrophilic solvent 1 from nonaqueous solvent 2.

A glass lens 4 as a material to be cleaned was successively washed with a solvent, a surfactant, clean water and demineralized water. The glass lens 4 was held at the tip of a holding member 5 and dipped in IPA as the hydrophilic solvent 1 to thereby remove water drops adhering to the surface of the material. Subsequently, the glass lens 4 was dipped in the nonaqueous solvent 2 of hexamethyldisiloxane maintained at 10° to 30° C. Thus, the IPA adhering to the glass lens 4 was dissolved in the hexamethyldisiloxane. Thereafter, the glass lens 4 was lifted, and the hexamethyldisiloxane was evaporated off from the surface of the glass lens 4 to dry the same.

The above cleaning operations were repeated for each glass lens 4, and IPA was separated from the hexamethyldisiloxane. This separation was performed by putting demineralized water 3 in an amount not smaller than that of the IPA contained in the hexamethyldisiloxane into the hexamethyldisiloxane, agitating and withdrawing the demineralized water containing the IPA gathered on the bottom of the vessel 6 through a bibcock 7 provided at a bottom part of the vessel 6. The demineralized water containing the separated IPA was treated by a membrane and other separating means.

The affinity of demineralized water is stronger for IPA than for hexamethyldisiloxane, so that the IPA having been introduced in the hexamethyldisiloxane is withdrawn into the demineralized water subsequently charged. The IPA is separated from the hexamethyldisiloxane by the treatment of the withdrawn demineralized water containing the IPA. Thus, regeneration of the hexamethyldisiloxane is accomplished.

The reason for the use of hexamethyldisiloxane having a viscosity of 0.65 cSt at 20° C. in this Example is its excellent capability of drying and compatibility with IPA. When the viscosity is 5 cSt or higher at 20° C., the drying rate is low and the compatibility with IPA is poor. From the viewpoint of effectivity, it is preferred that the glass lens 4 be dipped in hexamethyldisiloxane under agitation. The same effect as attained by the agitation is exhibited by putting the demineralized water in showery fashion.

Figure 2:
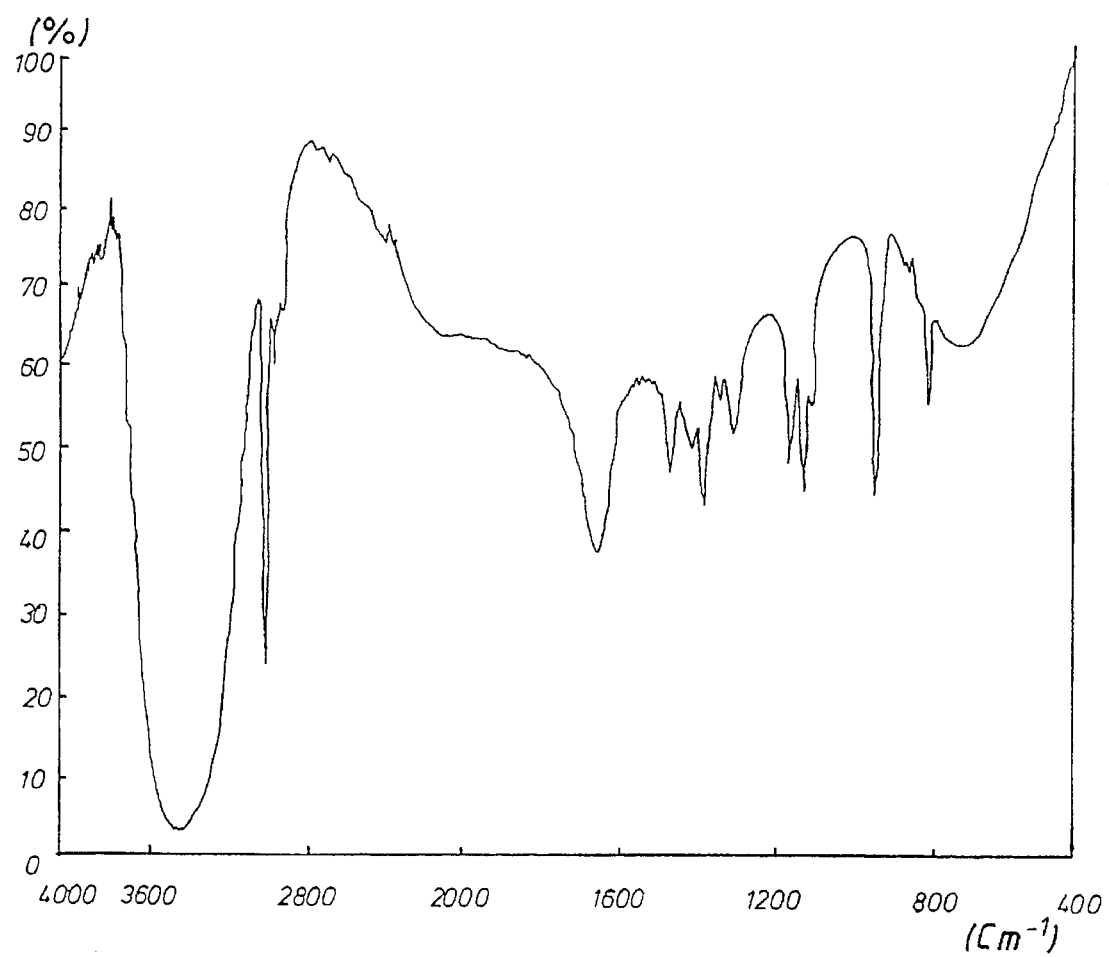
FIG. 2 a characteristic spectrum obtained by infrared spectroscopic analysis of a lower layer fluid separated in the above first embodiment.
Figure 3:
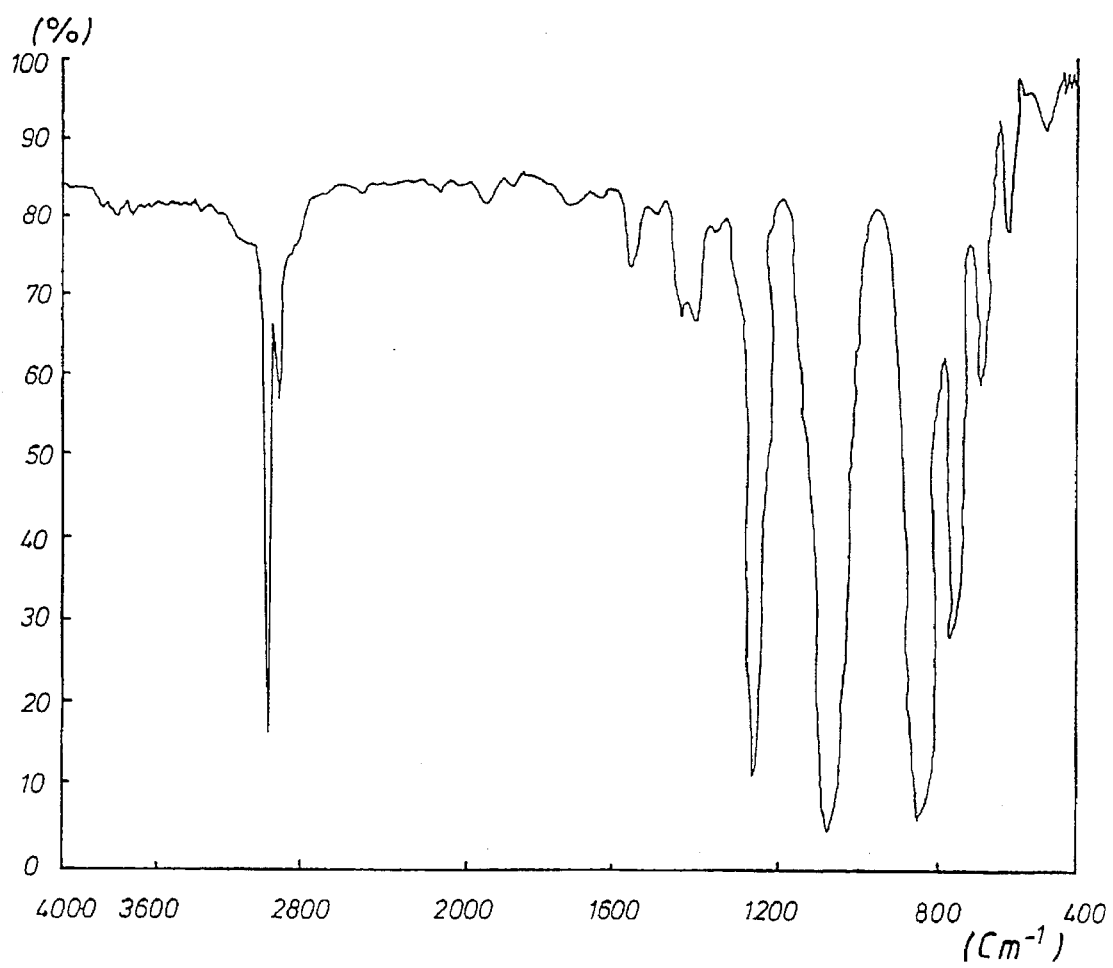
FIG. 3 a characteristic spectrum obtained by infrared spectroscopic analysis of an upper layer fluid separated in the above first embodiment.

Spectra obtained by infrared spectroscopic analysis of lower and upper layers formed after the incorporation of demineralized water into the hexamethyldisiloxane containing IPA are shown in FIGS. 2 and 3, respectively. FIG. 2 is for the lower layer, and FIG. 3 is for the upper layer of regenerated hexamethyldisiloxane solution. In these figures, the axis of abscissa indicates wavelength ($cm^{-1}$) while the axis of ordinate indicates transmittance (%). In FIG. 2, the absorption characteristic of —OH appears at 3400 $cm^{-1}$, while the absorption characteristic of —CH appears at 2800 to 3000 $cm^{-1}$. Further, the absorption characteristic of IPA appears at 800 to 1500 $cm^{-1}$. The broad peaks at 3200 to 3600 $cm^{-1}$, 1600 to 1700 $cm^{-1}$ and about 700 $cm^{-1}$ indicate the presence of water. On the other hand, FIG. 3 shows no peaks indicating IPA and water, while it shows the absorption characteristic of Si—O and Si—C at 700 to 1300 $cm^{-1}$. That is, the above demonstrates that the upper layer is composed of hexamethyldisiloxane and the lower layer composed of demineralized water containing IPA. The separation into the upper and lower layers is caused by specific gravity difference.

The concentration of IPA in hexamethyldisiloxane as a measure of the requirement for regeneration is determined by IR, UV-VIS, RI (differential refractive index) or the like. When the IPA concentration reaches at least 5%, the performance as the drying fluid 2 becomes poor, so that regeneration is preferably carried out. Table 1 demonstrates the safety of hexamethyldisiloxane employed in this Example as compared with that of IPA vapor.

TABLE 1

| Material | Chemical Resistance | | Toxicity | |
| --- | --- | --- | --- | --- |
| to be cleaned | hexamethyl disiloxane | IPA vapor | hexamethyl disiloxane | IPA vapor |
| Optical glass Plastic lens | no change | no change | none | toxic |
| (PMMA) (PC) | no change no change | putrefied putrefied | (contain no toxic substance) | (dangerous when continuously inhaled) |
| Aluminum | no change | no change | | |

(Example 2)

An electrical mount substrate as a material to be cleaned was treated in the same manner as in Example 1, except that an alkyd-modified silicone oil volatile at ordinary temperatures, ethanol and demineralized water were employed as the nonaqueous solvent, the hydrophilic solvent and the separation fluid, respectively.

(Example 3)

An electrical mount substrate as a material to be cleaned was treated in the same manner as in Example 1, except that methylphenylsilicone volatile at ordinary temperatures, IPA and demineralized water were employed as the nonaqueous solvent, the hydrophilic solvent and the separation fluid, respectively.

(Example 4)

A glass lens was treated in the same manner as in Example 1, except that a silane compound volatile at ordinary temperatures, IPA and demineralized water were employed as the nonaqueous solvent, the hydrophilic solvent and the separation fluid, respectively.

(Example 5)

A glass lens was treated in the same manner as in Example 1, except that a silicone or silane compound volatile at ordinary temperatures to which a halide was added for increasing the flame retardancy, IPA and demineralized water were employed as the nonaqueous solvent, the hydrophilic solvent and the separation fluid, respectively.

In any of the above Examples 2 to 5, the hydrophilic solvent was separated from the nonaqueous solvent in the same manner as in Example 1, thereby regenerating the nonaqueous solvent. As in Example 5, an antioxidant, a fire resistance imparting agent, a perfume or the like may be added as appropriate to the nonaqueous solvent.

(Example 6)

Figure 4:
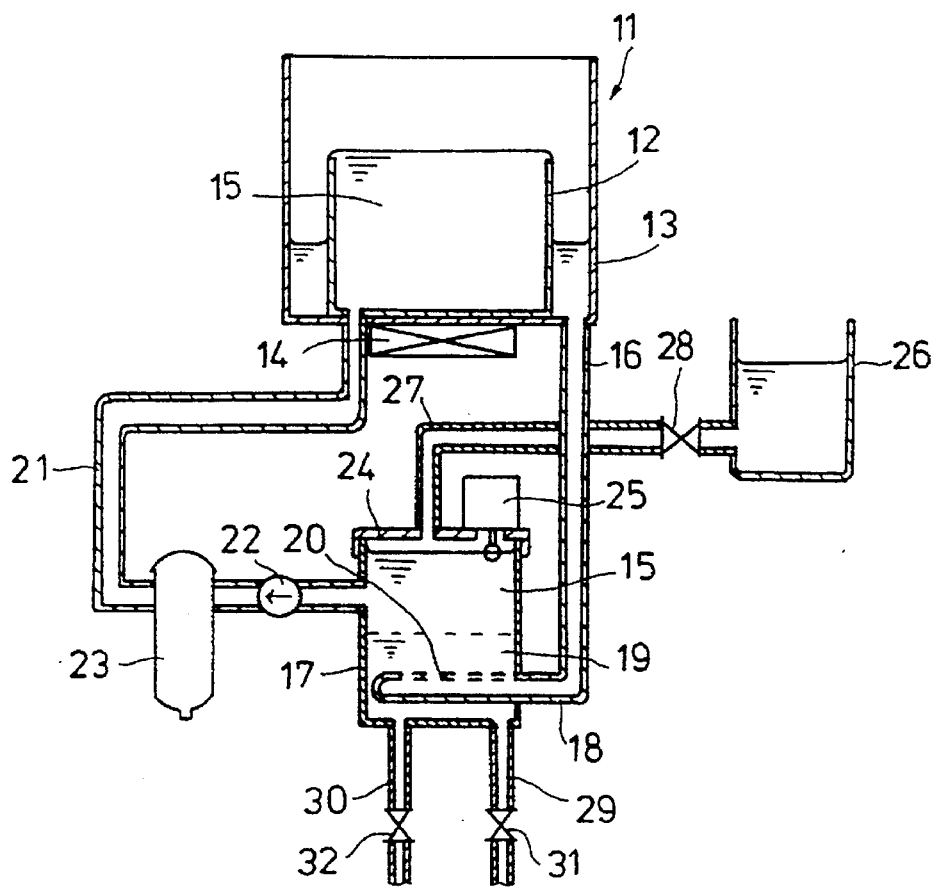
FIG. 4 a sectional view of a regenerating apparatus according to the sixth embodiment of the present invention.
Figure 5:
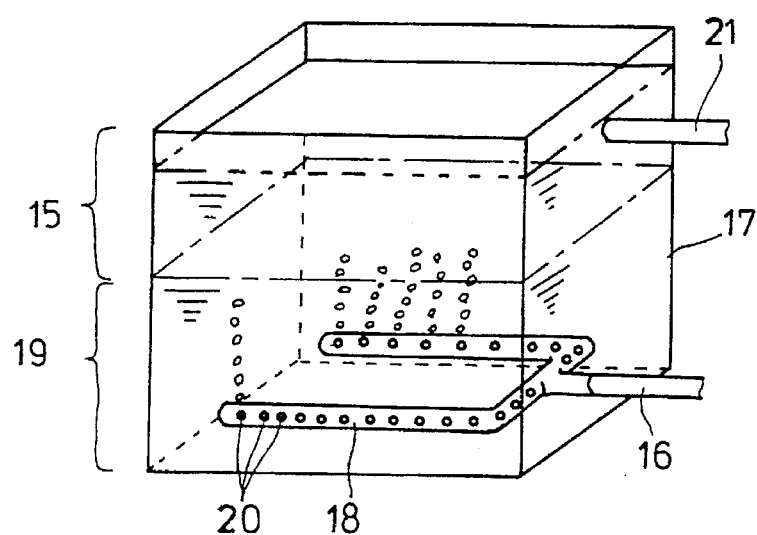
FIG. 5 a perspective view of a separation vessel employed therein.

FIG. 4 illustrates a nonaqueous solvent regenerating apparatus according to the sixth embodiment of the present invention, and FIG. 5 illustrates a separation vessel for use therein.

In FIG. 4, numeral 11 denotes a washing vessel consisting of an inner vessel 12 and an outer vessel 13. The outer vessel 13 has an ultrasonic generator 14 provided at the outside center of the bottom thereof. The outer vessel 13 receives the nonaqueous solvent 15 composed of a silicone compound having overflowed from the inner vessel 12. A recovery pipe 16 for the nonaqueous solvent 15 is connected to the bottom of the outer vessel 13 at the interstice between the inner vessel 12 and the outer vessel 13. The recovery pipe 16 is connected to a lower part of a separation vessel 17, and its tip becomes a nonaqueous solvent discharge pipe 18 extending into the separation vessel 17. A separation fluid 19 consisting of the nonaqueous solvent 15 and water being vertically separated from each other due to a specific gravity difference is placed in the separation vessel 17. The nonaqueous solvent discharge pipe 18 is positioned at a lower part of the separation vessel 17 where the separation fluid 19 is reserved. The nonaqueous solvent discharge pipe 18 has many openings of discharge holes 20 (see FIG. 5) so as to ensure efficient dissolution of the IPA contained in the nonaqueous solvent 15 recovered by means of the recovery pipe 16 into the separation fluid 19.

A regenerated fluid circulating pipe 21 is connected to an upper flank of the separation vessel 17 in which the nonaqueous solvent 15 is placed, and the other end of the pipe 21 is connected through the bottom of the outer vessel 13 to the bottom of the inner vessel 12. A pump 22 and a filter 23 are connected to the regenerated fluid circulating pipe 21 at part ways therealong, which cooperate to circulate the nonaqueous solvent 15 on the route of washing vessel 11→separation vessel 17→washing vessel 11. The filter 23 is provided to remove particles from the fluid. The separation vessel 17 is further provided with an upper lid 24, which is provided with a float switch 25 as a sensor for sensing the liquid level of the nonaqueous solvent 15 and with a supply pipe 27 communicating with a supply vessel 26 for supplying fresh nonaqueous solvent 15. The supply pipe 27 is provided with a valve 28, which is opened when the float switch 25 senses a lowering of the liquid level of the nonaqueous solvent 15, so that fresh nonaqueous solvent 15 is fed from the supply vessel 26 into the separation vessel 17. A separation fluid feeding pipe 29 and a separation fluid discharging pipe 30 are connected to the bottom of the separation vessel 17. The separation fluid feeding pipe 29 is connected to a demineralized water feeding apparatus not shown, and the separation fluid discharging pipe 30 is connected to a discharged water storage tank not shown. The separation fluid feeding pipe 29 and the separation fluid discharging pipe 30 are respectively provided with valves 31 and 32, so that the separation fluid can be freely fed or discharged. The separation vessel 17 is filled to about half thereof with the water, as the separation fluid, fed through the separation fluid feeding pipe 29 from the demineralized water feeding apparatus.

Figure 6:
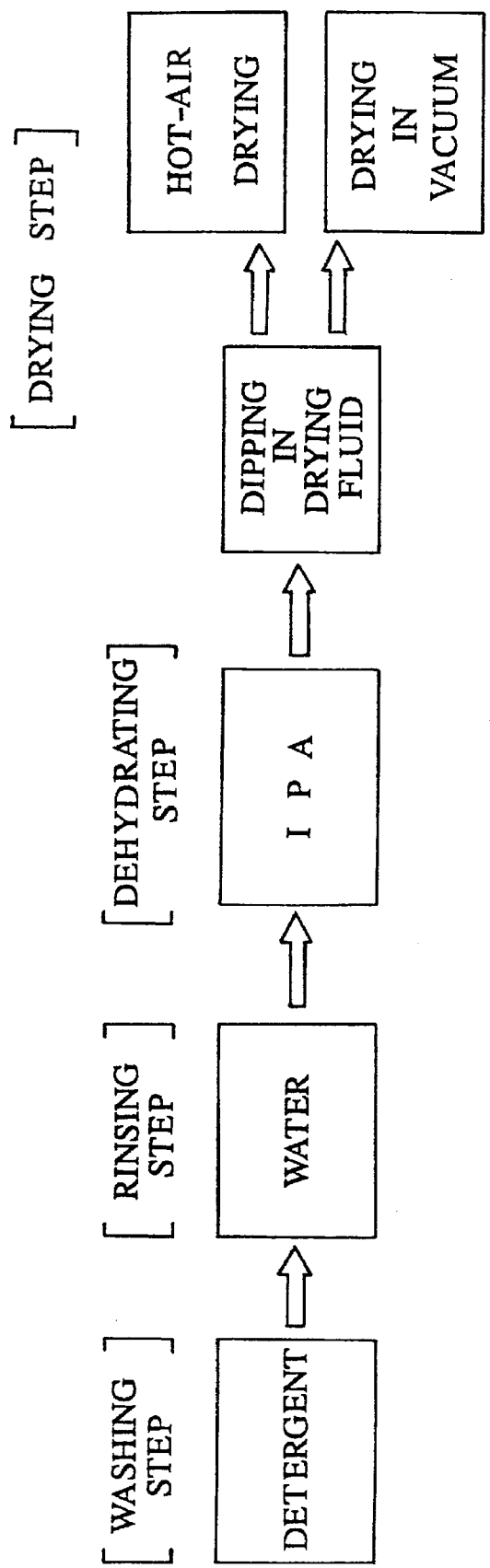
FIG. 6 a flow chart of a cleaning system.

FIG. 6 shows a cleaning system including the regenerating apparatus of this Example.

In the first washing step, organic soils such as cutting oil and fingerprints and inorganic soils such as cerium oxide and dust which are adhering to a material to be cleaned such as a lens and other optical parts are removed with the use of a cleaning agent (detergent). In the second rinsing step, the cleaning agent is washed off with clean water or demineralized water. In the third dehydrating step, the water adhering to the material is replaced by IPA. In the fourth drying step, the material is dipped in a nonaqueous solvent to thereby replace the IPA with the nonaqueous solvent with the use of the regenerating apparatus of this Example. The material is then lifted, and either hot-air drying with clean air or vapor drying in vacuum is conducted to thereby complete the cleaning process.

The function of the regenerating apparatus of this Example included in the above cleaning system will be described below.

The IPA having replaced water in the previous dehydrating step and adhering to the material is dissolved and dispersed in the nonaqueous solvent 15 at the time of the dipping of the material in the nonaqueous solvent 15 of the inner vessel 12 of the washing vessel 11, so that the IPA is removed from the material. The IPA-containing nonaqueous solvent 15 having overflowed the upper end of the inner vessel 12 into the outer vessel 13 is passed through the recovery pipe 16 and discharged through the discharge holes 20 of the nonaqueous solvent discharge pipe 18 into the separation fluid 19. This separation fluid 19 has higher compatibility with IPA than with the nonaqueous solvent 15, so that the IPA contained in the nonaqueous solvent 15 is dissolved in the separation fluid 19 while a fluid layer of regenerated nonaqueous solvent 15 floats on the separation fluid 19 during the rise of the nonaqueous solvent 15 through the separation fluid 19 up to the upper surface thereof.

The nonaqueous solvent 15 forming the upper layer of the separation vessel 17 is fed through the regenerated fluid circulating pipe 21 and through the bottom of the washing vessel 11 into the inner vessel 12. On the other hand, the separation fluid 19 containing IPA is periodically discharged through the separation fluid discharging pipe 30 into the discharge storage tank, and also demineralized water is fed from the demineralized water feeding apparatus through the separation fluid feeding pipe into the separation fluid 19, so that the height of the liquid level of the separation fluid 19 in the separation vessel 17 is kept constant, and so that the concentration of IPA mixed thereinto is kept at a given level or lower.

The concentration of IPA in the nonaqueous solvent 15 regenerated by the use of the regenerator of this Example was analyzed by gas chromatography. As a result, it was confirmed that the purity of the nonaqueous solvent could be kept at 99% or higher, which would gradually increase in the continuous cleaning without the use of the regenerator.

(Example 7)

Figure 7:
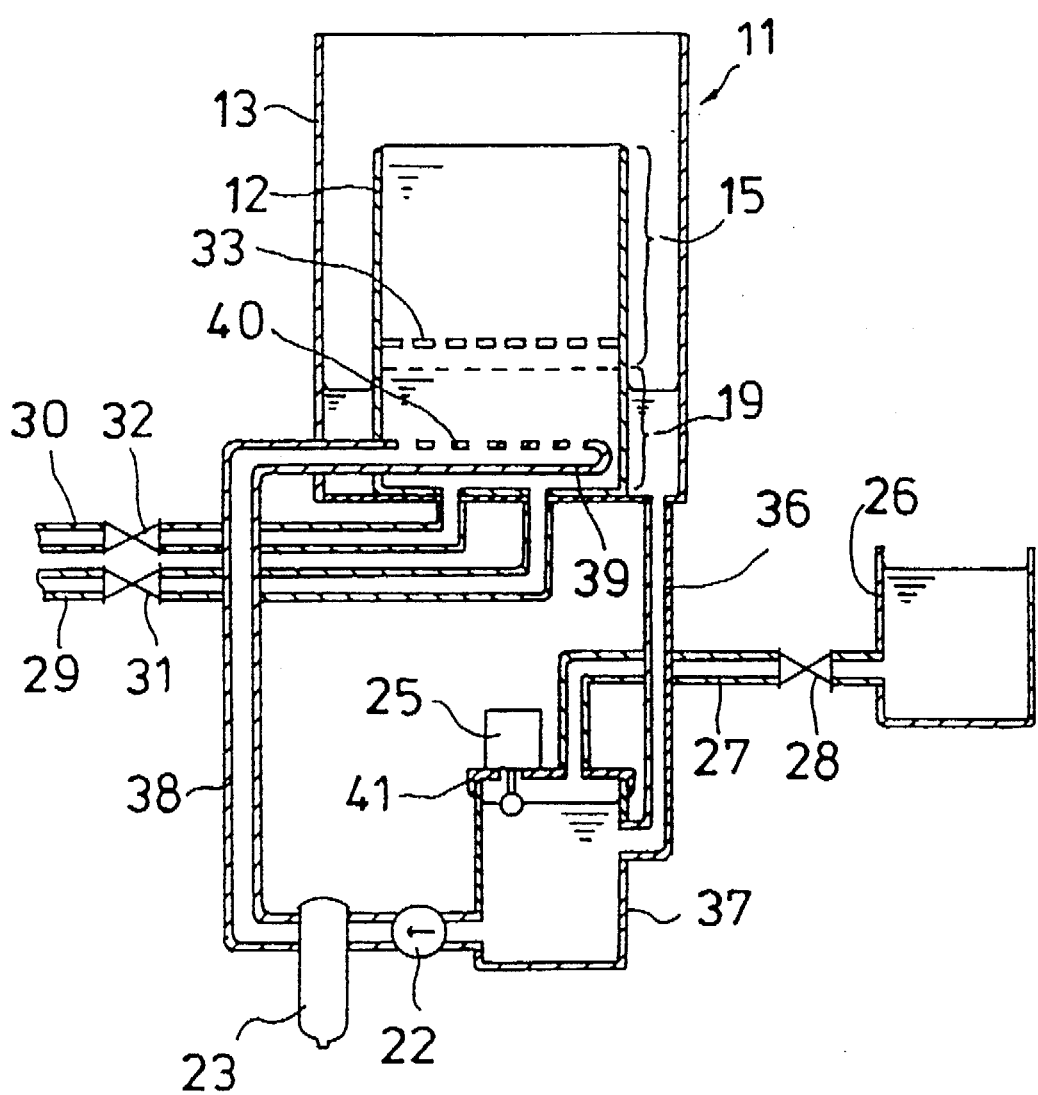
FIG. 7 a sectional view of a regenerating apparatus according to the seventh embodiment of the present invention.

FIG. 7 illustrates a nonaqueous solvent regenerating apparatus according to the seventh embodiment of the present invention, in which the same elements as in Example 6 are denoted by the same numerals.

A washing vessel 11 consists of an inner vessel 12 and an outer vessel 13. A net partition plate 33 is disposed around the middle of the inner vessel 12. A recovery pipe 36 for the nonaqueous solvent 15 is connected to the bottom of the outer vessel 13 at the interstice between the inner vessel 12 and the outer vessel 13 of the washing vessel 11. The other end of the recovery pipe 36 is connected to an upper flank of a buffer vessel 37. A fluid circulation pipe 38 feeding the nonaqueous solvent 15 of the buffer vessel 37 into the inner vessel 12 is connected to a lower flank of the buffer vessel 37. The fluid circulation pipe 38 passes through the outer vessel 13 and is connected to a lower flank of the inner vessel 12. The tip of the fluid circulation pipe 38 forms a discharge pipe 39 and extends inside the inner vessel 12. The discharge pipe 39 is provided with a number of discharge holes 40. A pump 22 and a filter 23 are connected to the discharge pipe 39, which cooperate to circulate the nonaqueous solvent 15 on the route of washing vessel 11→buffer vessel 37→washing vessel 11.

The buffer vessel 37 is provided with an upper lid 41, which is provided with a float switch 25 as a sensor for sensing the liquid level of the nonaqueous solvent 15 and with a supply pipe 27 communicating with a supply vessel 26 for supplying fresh nonaqueous solvent 15. The supply pipe 27 is provided with a valve 28, which is opened when the float switch 25 senses a lowering of the liquid level of the nonaqueous solvent 15, so that fresh nonaqueous solvent 15 is fed from the supply vessel 26 into the buffer vessel 37.

A separation fluid feeding pipe 29 and a separation fluid discharging pipe 30 pass through the outer vessel 13 and are connected to the bottom of the inner vessel 12. The separation fluid feeding pipe 29 is connected to a demineralized water feeding apparatus not shown, and the separation fluid discharging pipe 30 is connected to a discharge storage tank not shown. The separation fluid feeding pipe 29 and the separation fluid discharging pipe 30 are respectively provided with valves 31 and 32, so that the separation fluid can be freely fed or discharged. The inner vessel 12 is filled up to below the partition plate 33 with the water, as the separation fluid 19, fed through the separation fluid feeding pipe 29 from the demineralized water feeding apparatus.

In this seventh embodiment, the IPA-containing nonaqueous solvent 15 having overflowed the upper end of the inner vessel 12 is passed through the recovery pipe 36, accommodated in the buffer vessel 37, passed through the fluid circulation pipe 38 by means of the pump 22 and discharged through the discharge holes 40 of the nonaqueous solvent discharge pipe 39 into the separation fluid 19. The IPA contained in the nonaqueous solvent is dissolved in the water while a fluid layer of regenerated nonaqueous solvent 15 floats on the separation fluid 19 during the rise of the discharged nonaqueous solvent through the separation fluid 19 up to the upper surface thereof, as in the above sixth embodiment. On the other hand, the separation fluid 19 containing IPA is periodically discharged through the separation fluid discharging pipe 30 into the discharge storage tank, and also demineralized water is fed from the demineralized water feeding apparatus through the separation fluid feeding pipe 29 into the separation fluid 19, so that the height of the liquid level of the separation fluid 19 in the inner vessel 12 is kept constant, and so that the concentration of IPA mixed thereinto is kept at a given level or lower.

In the seventh embodiment, the regeneration of the nonaqueous solvent 15 is carried out in the inner vessel 12 of the washing vessel 11, so that the separation vessel employed in Example 6 is not needed. The concentration of IPA in the regenerated nonaqueous solvent 15 was analyzed by gas chromatography. As a result, it was confirmed that the same effect as in Example 6 was achieved.

(Example 8)

Figure 8:
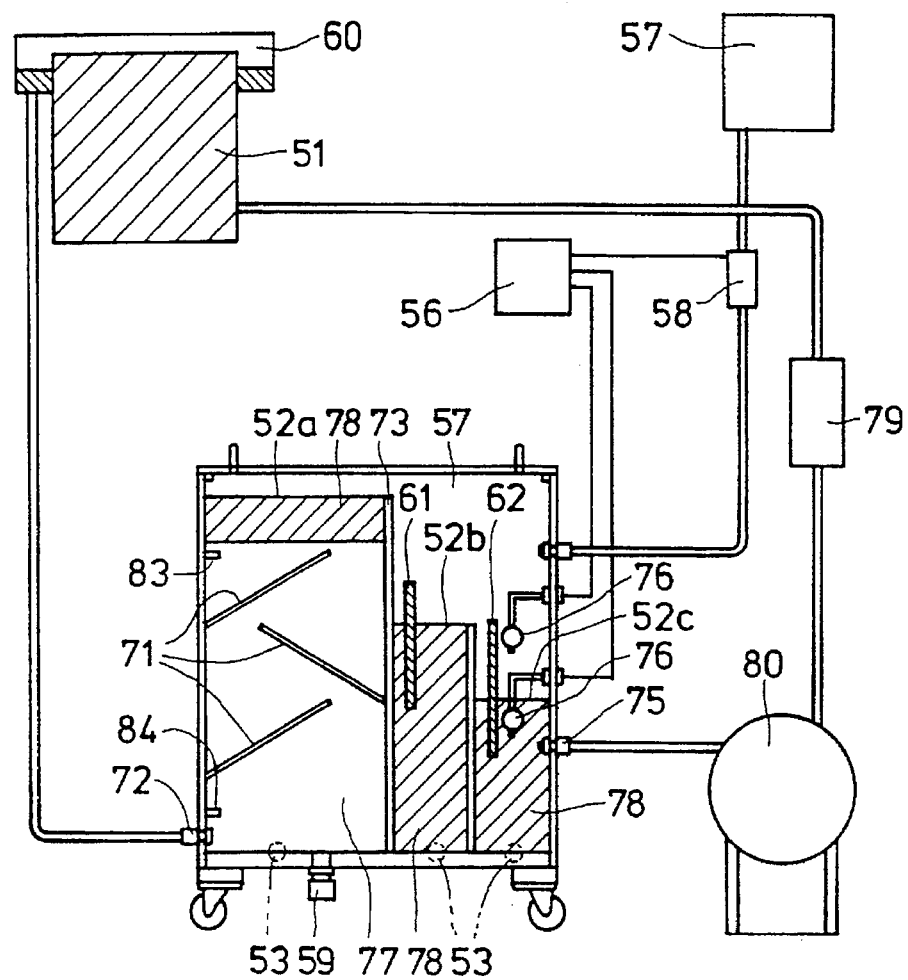
FIG. 8 a sectional view of a regenerating apparatus according to the eighth embodiment of the present invention.
Figure 9:
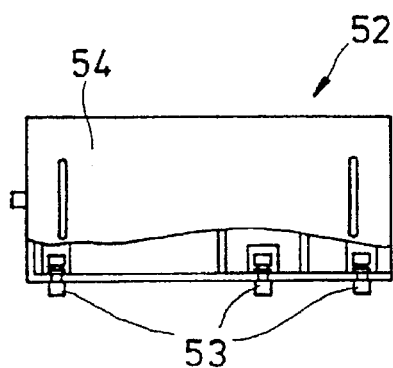
FIG. 9 a side view of a separation vessel employed therein.

FIGS. 8 and 9 illustrate a nonaqueous solvent regenerating apparatus according to the eighth embodiment of the present invention. A drying vessel 51 filled with a nonaqueous solvent for use in drying a washed material is provided with an overflow vessel 60, to which a separation vessel 52 is connected through a pipe. The separation vessel 52 is composed of three vessels, i.e., first vessel 52a, second vessel 52b and third vessel 52c which are divided by partition plates 73, 74. These vessels have heights gradually decreased in the order of first vessel 52a, second vessel 52b and third vessel 52c, and the vessel having smaller height receives the nonaqueous solvent having overflowed from the vessel having greater height. The first vessel 52a separates the nonaqueous solvent from a hydrophilic solvent mixed therein, and the inside of the vessel is filled with demineralized water 77 as a separation fluid. The nonaqueous solvent from the overflow vessel 60 is fed into the first vessel 52a through a fluid inlet 72 disposed at a lower part of the first vessel 52a. A plurality of separation plates 71 are disposed inside the first vessel 52a. The plurality of separation plates 71 are slantly disposed in the first vessel so as to crosswise face with each other. The nonaqueous solvent 78 fed through the fluid inlet 72 rises along the separation plates 71 due to a specific gravity difference between the nonaqueous solvent and demineralized water until it is held in the upper part of the first vessel 52a and caused to overflow into the second vessel 52b.

The second vessel 52b and the third vessel 52c of the separation vessel 52 are respectively provided with vertical fractionation plates 61, 62 each of which prevents mixing of the nonaqueous solvent flowing thereinto and the nonaqueous solvent flowing out therefrom. In the second vessel 52b and the third vessel 52c, the nonaqueous solvent is separated from the water contained in the nonaqueous solvent due to a specific gravity difference. The third vessel 52c is provided with a liquid level sensor 76 capable of detecting the upper-limit and lower-limit liquid levels of the vessel 52c, by which whether the amount of the nonaqueous solvent is greater or small than a given value is detected. Each of the vessels 52a, 52b and 52c is provided with a drain valve 53 adapted to permit withdrawal and replacement of the fluid present in the vessel (see FIG. 9), and a water discharge valve 59 is disposed at a lower side of the first vessel 52a. In FIG. 9, numeral 54 denotes a lid covering the upper part of the separation vessel 52.

Numeral 80 denotes a pump connected to a fluid outlet 75 of the third vessel 52c of the separation vessel 52, by which the fluid is circulated within the apparatus. A drying vessel 51 is connected through a filter 79 to the pump 80. Numeral 57 denotes a supply vessel for supplying a fresh nonaqueous solvent, which is connected through a make-up valve 58 to the fluid outlet 75 of the third vessel 52c of the separation vessel 52. Numeral 56 denotes a controller which judges whether or not to feed a fresh nonaqueous solvent on the basis of the signal transmitted from the liquid level sensor 76, and which opens or closes the make-up valve 58.

Numerals 83 and 84 are liquid quantity sensors disposed at upper and lower parts of the first vessel 52a of the separation vessel 52, respectively. A capacitance sensor measuring the conductivity of the fluid accommodated in the first vessel 52a may be used as each of the liquid quantity sensors 83, 84. The upper liquid quantity sensor 83 detects the boundary between the nonaqueous solvent 78 and the demineralized water 77. That is, when the amount of the demineralized water 77 accommodated in the first vessel 52a is increased to reach the height of the liquid quantity sensor 83, the liquid quantity sensor 83 detects the same. Upon the detection, the discharge valve 59 is automatically opened to thereby discharge demineralized water 77. Therefore, it does not occur that the amount of demineralized water 77 exceeds the liquid quantity sensor 83 in the first vessel 52a, so that it does not occur that the demineralized water 77 overflows the first vessel 52a into the second vessel 52b. When the above discharge causes the amount of demineralized water 77 to decrease until the interface with the nonaqueous solvent 78 reaches the lower liquid quantity sensor 84, this is detected by the liquid quantity sensor 84. Upon the detection, the discharge valve 59 is automatically closed to thereby stop the discharge of demineralized water. Therefore, it does not occur that the amount of demineralized water in the first vessel 52a is below a given level, so that the separation by demineralized water can be sustained. A valve (not shown) for feeding demineralized water 77 is connected to the first vessel 52a, by which demineralized water 77 is fed so as to maintain a given amount of demineralized water 77.

The procedure of this embodiment in which octamethyltrisiloxane having a viscosity of 1 cSt (25° C.) and IPA (hereinafter referred to as "alcohol") are used as a nonaqueous solvent and a hydrophilic solvent, respectively, will be described below. Fresh silicone oil having a purity of 99.9% is reserved in the supply vessel 57. A biconvex glass lens having a coring oil (produced by Yushiron Kagaku K. K.) adhering thereto due to coring processing is used as a material to be cleaned. This lens is first washed with a cleaning agent, secondly rinsed with water, thirdly dehydrated with the alcohol, and thereafter finish-dried with silicone oil in the drying vessel 51.

As a result of the above cleaning, the alcohol-containing silicone oil having overflowed the drying vessel 51 has a purity of 99.0%, which is fed through a pipe and through the fluid inlet 72 into the first vessel 52a of the separation vessel 52. The silicone oil 78 containing the alcohol is separated in the demineralized water 77 previously placed in the first vessel 52a due to a specific gravity difference, and surfaces. The surfacing silicone oil containing the alcohol rises through the demineralized water 77 along the separation plates 71 slantly disposed in the first vessel 52a. During the rise, the alcohol contained in the silicone oil 78 is absorbed in the demineralized water 77.

When this is repeated for long, the amount of the alcohol in the silicone oil 78 is reduced, so that an silicone oil having a high purity surfaces. The measurements by gas chromatography and Karl Fischer's moisture meter show that the purity of the silicone oil is 99.3%. The excess gathering of the silicone oil 78 having surfaced results in overflowing thereof from the first vessel 52a into the second vessel 52b. The water is further separated from the silicone oil 78 having overflowed during the accumulation thereof due to a specific gravity difference and gathered on the bottom of the vessel.

The accumulation of the silicone oil 78 having been separated and surfaced results in overflowing thereof from the second vessel 52b into the third vessel 52c. The purity of the silicone oil overflowing the second vessel is 99.5%. In this manner, the silicone oil 78 of high purity (99.8%) is gathered in the third vessel. Thus, the regeneration of the silicone oil 78 is carried out, and the regenerated silicone oil is sucked from the fluid outlet 75 by means of a pump, and recycled into the drying vessel 51.

Thus, the drying vessel 51 can constantly reserve the silicone oil 78 having the alcohol removed therefrom. When the amount of silicone oil is reduced by evaporation, the liquid level sensor 76 detects the same to cause the controller 66 to open the make-up valve 58 of the supply vessel 57 so that fresh silicone oil having a purity of 99.8% is supplied. Further, when the feeding of the hydrophilic solvent into the drying vessel is increased to thereby increase the amount of the whole fluid, the liquid level sensor 76 detects the same to cause the controller 56 to open the drain valve 59 so that the water is discharged until the amount of the fluid is optimized.

(Example 9)

Figure 10:
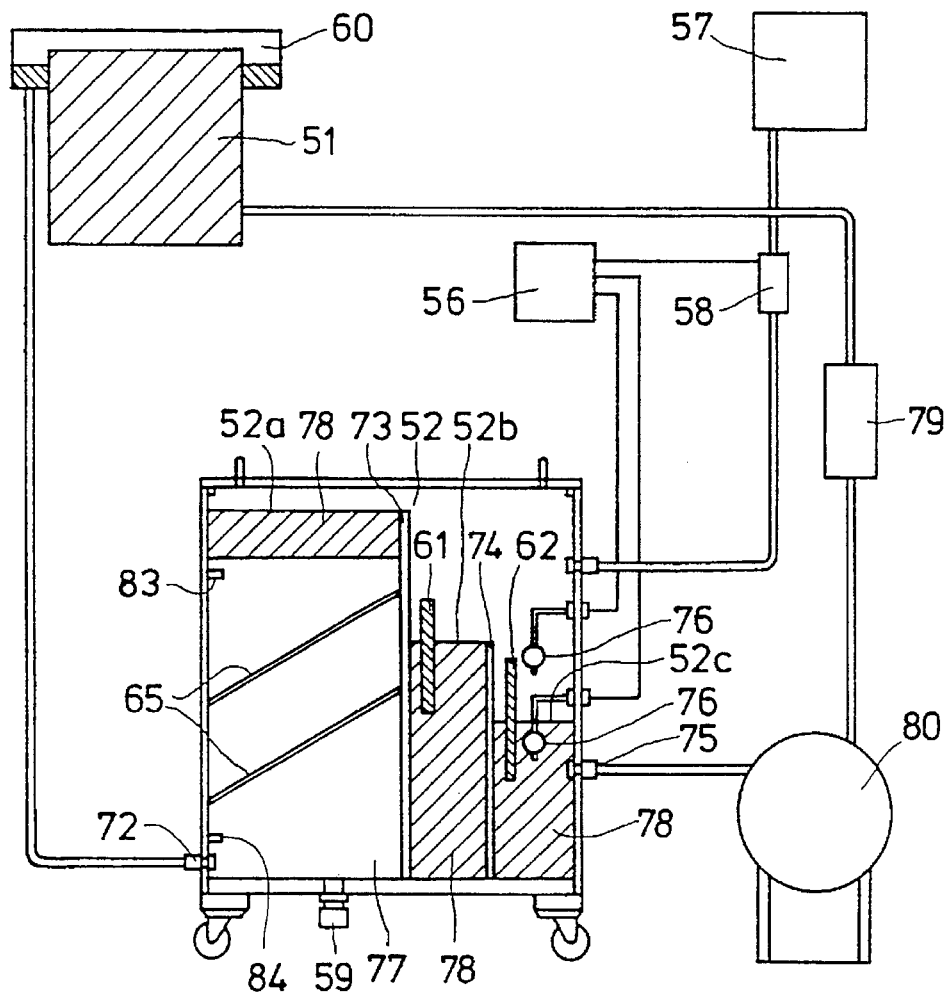
FIG. 10 a sectional view of a regenerating apparatus according to the ninth embodiment of the present invention.
Figure 11:
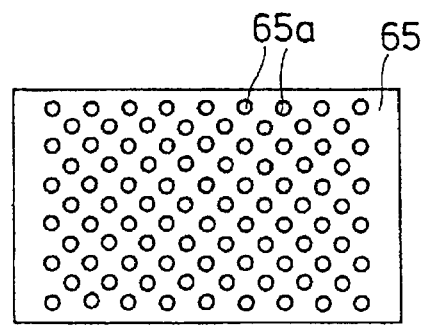
FIG. 11 is a plan view of a separation plate employed therein.

FIGS. 10 and 11 illustrate a nonaqueous solvent regenerating apparatus according to the ninth embodiment of the present invention, in which the same elements as in Example 8 are denoted by the same numerals. In FIG. 10, a plurality of separation plates 55 are disposed in a first vessel 52a of a separation vessel 52, which are slanted in the same direction. Porous plates each having a number of openings of holes 55a as shown in FIG. 11 are used as the separation plates 55.

In this ninth embodiment, a glass lens having experienced the same processing as in the eighth embodiment is put in a drying vessel 51. Measurement of the purity of the silicone oil having overflowed from the drying vessel 51 shows that it is 99.0%. The silicone oil containing the alcohol is fed through a pipe and a fluid inlet 72 into the first vessel 52a of the separation vessel 52. The silicone oil is separated from and surfaces through the demineralized water 77 placed in the first vessel 52a due to a specific gravity difference. The alcohol contained in the silicone oil is absorbed in the demineralized water during the course of contact of the surfacing silicone oil with the separation plates 55 and its passage through the holes. Measurement of the purity of the silicone oil at an upper part of the first vessel 52a shows that it is 99.2%. The repetition of the above removes the alcohol from the silicone oil, leading to the surfacing of the silicone oil 78 having a purity as high as 99.4% in the second vessel and about 99.8% in the third vessel. Illustratively, the accumulation of the silicone oil 78 having surfaced causes overflowing thereof from the first vessel 52a into the second vessel 52b. The silicone oil 78 having flowed in the second vessel 52b is separated by a fractionation plate 61 to be accumulated in the right side of the vessel (see FIG. 10). During this accumulation, the water is separated due to a specific gravity difference to thereby be gathered on the bottom of the vessel. The silicone oil 78 having been separated and surfaced has a purity of about 99.4%, and the accumulation of the silicone oil 78 results in flowing thereof over a partition plate 74 into the third vessel 52c. In this manner, the silicone oil 78 having a purity increased by separation with a fractionation plate 62 is gathered in the third vessel. The purity of the silicone oil at that time is about 99.8%. The silicone oil 78 is sucked from a fluid outlet 75 by means of a pump and recycled into a drying vessel 51. Thus, the drying vessel 51 can constantly reserve the silicone oil 78 having a high purity.

Although the above Examples 8 and 9 have been described with the use of octamethyltrisiloxane having a viscosity of 1 cSt (25° C.), the same effect can be exerted with the use of octamethylcyclotetrasiloxane having a viscosity of 2.2 cSt (25° C.).

Although IPA has been employed as the hydrophilic solvent, in place thereof, use may be made of a lower alcohol such as ethanol, methanol or butanol, or a ketone such as acetone or methyl ethyl ketone.

The water is not necessarily to be in pure form, and, instead, use may be made of a mixed solution comprising water as a dispersion medium, e.g., water having a small amount of surfactant and/or hydrophilic solvent added thereto.

(Example 10)

Figure 12:
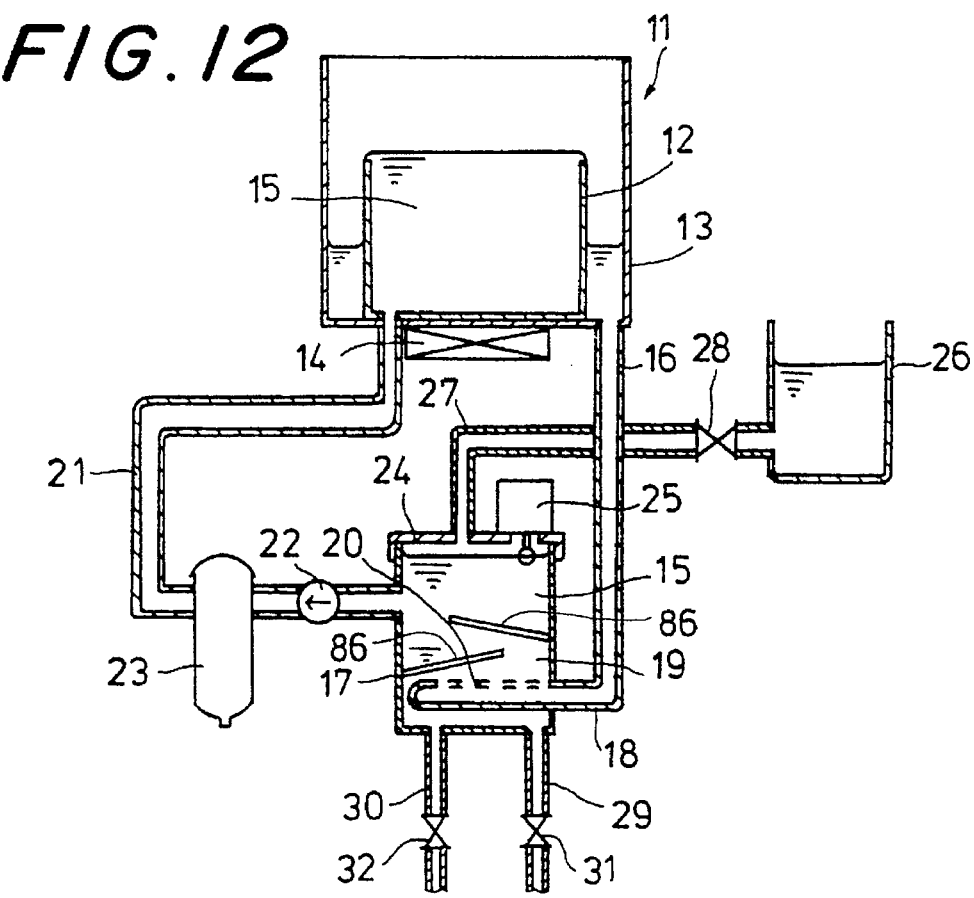
FIGS. 12 and 13 sectional views of different forms of regenerating apparatuses according to the tenth embodiment of the present invention.
Figure 13:
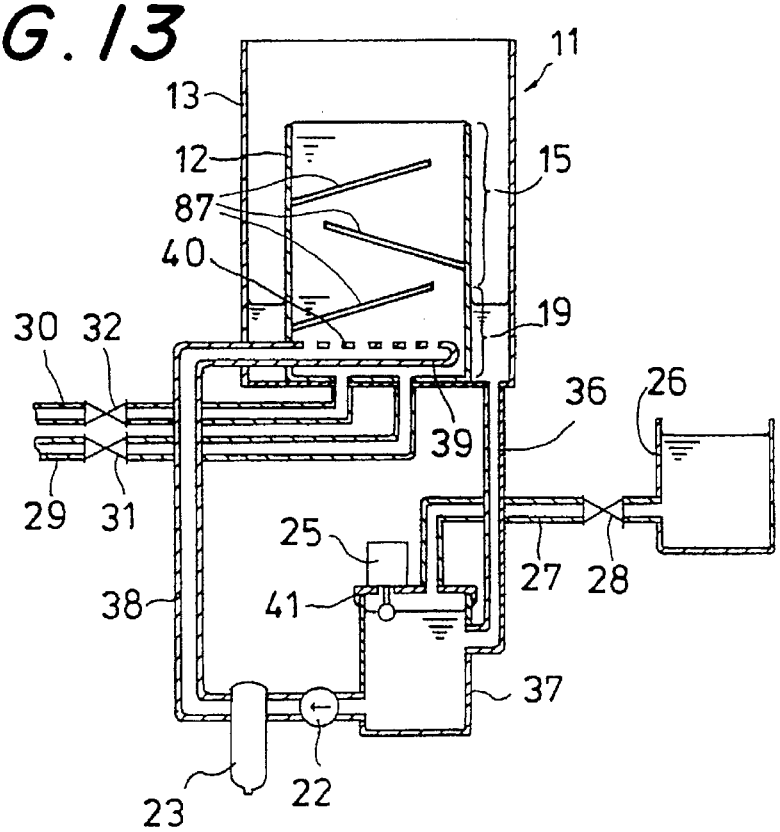

FIGS. 12 and 13 illustrate a nonaqueous solvent regenerating apparatus according to the tenth embodiment of the present invention. In FIG. 12, a plurality of separation plates 86 are disposed inside a separation vessel 17. In FIG. 13, a plurality of separation plates 87 are disposed inside a washing vessel 11. The plurality of separation plates 86, 87 are slantly disposed in the vessels 17, 11 so as to crosswise face with each other. The nonaqueous solvent charged in the vessels 17, 11 rises along the separation plates. During the rise, a hydrophilic solvent is effectively contacted with a separation fluid. Thus, the hydrophilic solvent contained in the nonaqueous solvent is effectively absorbed in the separation fluid to thereby regenerate the nonaqueous solvent.

The separation plates 86, 87 may be slantly disposed in parallel as shown in FIG. 10 and may be porous as shown in FIG. 11. The other elements of FIG. 12 are identical with the corresponding elements of the regenerating apparatus of FIG. 4, and the other elements of FIG. 13 are identical with the corresponding elements of the regenerating apparatus of FIG. 7. Therefore, the same numerals are employed therefor in order to avoid duplicative descriptions.

Industrial Applicability

In the present invention, a hydrophilic solvent contained in a nonaqueous solvent is contacted with a separation fluid having low compatibility with the nonaqueous solvent and high compatibility with the hydrophilic solvent to cause the hydrophilic solvent to be absorbed in the separation fluid, thereby regenerating the nonaqueous solvent. By virtue of the present invention, the hydrophilic solvent is effectively separated from the nonaqueous solvent to thereby achieve regeneration for increasing the purity of the nonaqueous solvent. Even if the regenerated nonaqueous solvent is recycled for the purpose of cleaning, none of stain and unevenness occurs in the cleaned material, thereby achieving clear cleaning.

We claim:

1. A method of cleaning and a method of regenerating a nonaqueous solvent that it is substantially immiscible with water comprising the steps of:

sequentially subjecting a material to be cleaned to washing with an aqueous cleaning agent, rinsing off the aqueous cleaning agent with water, replacing the water adhering to the material with a hydrophilic solvent, replacing the hydrophilic solvent adhering to the material with a nonaqueous solvent and drying, and contacting the nonaqueous solvent with a separation fluid thereby to regenerate the nonaqueous solvent.

2. The method according to claim 1, wherein the hydrophilic solvent is a lower alcohol or ketone.

3. The method according to claim 2, wherein the lower alcohol is methanol, ethanol, 2-propanol or butanol.

4. The method according to claim 2, wherein the nonaqueous solvent is a silicone compound.

5. The method according to claim 1, wherein the nonaqueous solvent is a silicone compound.

6. The method according to claim 5, wherein the silicone compound is a member selected from the group consisting of hexamethyldisiloxane, octamethyltrisiloxane and octamethylcyclotetrasiloxane each having a viscosity of 2.5 centistokes or below.

7. The method according to claim 5, wherein the silicone compound is a member selected from the group consisting of an alkyd-modified silicone oil, a methylphenylsilicone, a silane compound and a halide-added silane or silicone compound which are each volatile at ordinary temperatures and have a viscosity of 5 centistokes or below.

8. The method according to claim 1, wherein the separation fluid is water or demineralized water.

* * * * *